(12) United States Patent
Larsen

(10) Patent No.: US 7,950,955 B2
(45) Date of Patent: May 31, 2011

(54) MULTIPLE ORIENTATION BATTERY CONNECTOR

(75) Inventor: Glen C. Larsen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/971,448

(22) Filed: Dec. 17, 2010

(65) Prior Publication Data

US 2011/0097937 A1 Apr. 28, 2011

Related U.S. Application Data

(63) Continuation of application No. 12/605,860, filed on Oct. 26, 2009, now Pat. No. 7,857,658.

(51) Int. Cl.
*H01R 3/00* (2006.01)
(52) U.S. Cl. ........................................ 439/500; 429/121
(58) Field of Classification Search .................. 439/500, 439/172, 175, 289, 295, 202, 366, 626, 627, 439/628, 677, 678, 679; 429/1, 98, 100, 429/121, 123
See application file for complete search history.

(56) References Cited

U.S. PATENT DOCUMENTS

| | | | | |
|---|---|---|---|---|
| 4,394,059 A | * | 7/1983 | Reynolds | 439/500 |
| 4,731,308 A | * | 3/1988 | Goebel et al. | 429/121 |
| 5,194,340 A | * | 3/1993 | Kosako | 429/1 |
| 7,857,658 B1 | * | 12/2010 | Larsen | 439/500 |

* cited by examiner

*Primary Examiner* — Hae Moon Hyeon
(74) *Attorney, Agent, or Firm* — Alleman Hall McCoy Russell & Tuttle LLP

(57) ABSTRACT

A connector is provided for electrically coupling a battery with a battery-powered device. The connector includes a first dual-contact assembly and a second dual-contact assembly. Each of the dual-contact assemblies includes a positive contact for contacting a positive PP3 terminal of a PP3 battery, and a negative contact for contacting a negative PP3 terminal of the PP3 battery. Each dual-contact assembly is configured so that, when the dual-contact assembly is physically engaged with either of the PP3 battery terminals, one of the contacts of the dual-contact assembly electrically engages the PP3 battery terminal, while the other of the contacts of the dual-contact assembly is electrically insulated from the PP3 battery terminal. Accordingly, the PP3 battery may be installed in either of two valid connection states relative to the connector, in which appropriate electrical connectivity is provided via the connector to a device to be powered by the PP3 battery.

20 Claims, 3 Drawing Sheets

_US 7,950,955 B2_

MULTIPLE ORIENTATION BATTERY CONNECTOR

RELATED APPLICATIONS

This is a continuation of U.S. patent application Ser. No. 12/605,860, filed on Oct. 26, 2009, entitled "MULTIPLE ORIENTATION BATTERY CONNECTOR", the entire contents of which are hereby incorporated by reference.

BACKGROUND

Batteries are commonly used to provide power to electronic devices. Typically, batteries are placed within a battery-operated device in a particular orientation to properly complete an electrical circuit. For example, some batteries have a positive terminal at one end of the battery and a negative terminal at the other end of the battery, and the battery must be properly oriented so that the battery terminals engage appropriate contacts of the device. Other battery configurations include positive and negative terminals adjacent one another or in relative positions/locations other than at opposing ends of a battery. Regardless of the particular configuration of the battery and its terminals, incorrectly orienting batteries within a device or with respect to a battery connector may not only yield an incomplete circuit rendering the battery-operated device unusable, but may also cause electrical or other damage to the components of the device.

SUMMARY

Accordingly, the present description provides a connector for electrically coupling a battery with a battery-powered device. The connector includes first and second dual-contact assemblies, each of which includes a positive contact configured to contact a positive PP3 terminal of a PP3 battery and a negative contact configured to contact a negative PP3 terminal of the PP3 battery. Each dual-contact assembly is configured so that, when the dual-contact assembly is physically engaged with either of the PP3 battery terminals, one of the contacts of the dual-contact assembly electrically engages the PP3 battery terminal, while the other of the contacts of the dual-contact assembly is electrically insulated from the PP3 battery terminal. Accordingly, the PP3 battery may be installed with the connector in either of two valid connection states, in which appropriate electrical connectivity is provided via the connector to a device to be powered by the PP3 battery.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
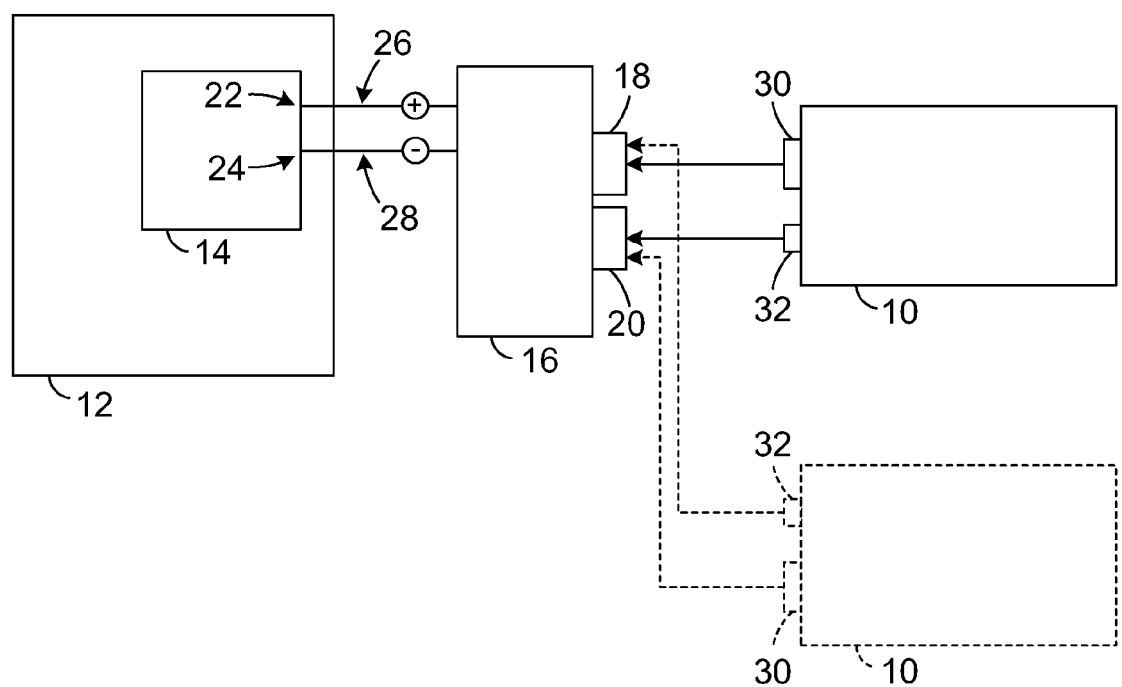
FIG. 1 schematically shows a battery and battery-powered device according to the present description, including a connector for electrically coupling the battery to a circuit of the device.

The present disclosure relates to a connector for electrically coupling a battery to a battery-powered device. As will be described with respect to various examples, the connector can be configured to enable valid operation regardless of the particular installed orientation of the battery. In many cases, the battery will have two terminals (positive and negative) that are to be connected to the battery-powered device. Typically, a pair of couplers or connection points is provided to facilitate the connection, thus presenting the possibility of physically orienting the battery relative to the device/connector in one of two different orientations. The connector examples described herein allow the battery to be validly connected in either orientation. Specifically, in either orientation, appropriate electrical connectivity is established to permit device operation and avoid the electrical/mechanical damage that can arise in prior art connectors that that allow for only one valid orientation.

In some previous solutions, users must insert batteries in a particular orientation, taking care to properly align positive and negative terminals with corresponding polarity-specific contacts (i.e., positive and negative) on the device. Although such previous solutions are at times accompanied by a diagram or instructions indicating proper battery orientation, it may be difficult to see such instructions under conditions where eyesight is compromised, such as poorly lit areas, or as may be the case for some elderly users. Additionally, such instructions may be difficult for young children to follow. Furthermore, following such diagrams each time batteries are replaced in a device that quickly goes through batteries may be unnecessarily time-consuming and such battery replacement may become frustrating to the user. As described above, incorrectly orienting batteries in such previous solutions not only renders the electrical circuit incomplete, but may also damage other electronic components of the device. Thus, the battery connector of the present disclosure includes dual-contact assemblies configured to validly accept batteries in either orientation, as described in more detail hereafter.

Some of the examples herein will be discussed in the context of a PP3 battery, also known as a 9-volt battery. In this battery configuration, the body of the battery is shaped as a rounded rectangular prism, and positive and negative terminals are provided next to each other on an end surface of the body/package of the battery. The negative PP3 terminal is relatively larger, and often is provided in a generally cylindrical form. More particularly, the negative PP3 terminal may be formed with a hexagonal or octagonal shape that can be snapped to a corresponding structure on a battery connector. The positive PP3 terminal is relatively smaller, and typically is also generally cylindrical but formed more specifically as a cylinder shape (i.e., typically without hexagonal/octagonal features). The positive PP3 terminal typically is also snapped or similarly connected to a corresponding structure on a battery connector.

While the examples herein will often focus on a PP3 battery as described above, it will be appreciated that the present discussion is applicable to a large extent to other battery and terminal configurations, including cylindrical batteries, coin-shaped batteries, and/or batteries in other form factors and configurations.

FIG. 1 schematically depicts a PP3 battery 10 and a device 12 that may be electrically powered by the battery. Device 12 includes a circuit 14 via which the device receives and distributes electrical power from the battery to other components of the device. Also depicted is a connector 16 for electrically coupling battery 10 to the circuit 14 of device 12. Connector 16 typically includes a first dual-contact assembly 18 and a second dual-contact assembly 20. As will be explained in further detail with reference to other figures, each of the dual contact assemblies includes a positive contact which is electrically coupled to a positive portion 22 of circuit 14 and a negative contact which is electrically coupled to a negative portion 24 of circuit 14. The connections of these contacts to the circuit are schematically shown in FIG. 1 as connections 26 and 28, which are positive and negative, respectively.

The connector 16 may be engaged with PP3 battery 10 in either of a first valid state and a second valid state. The first valid state is indicated by the solid-line representation of battery 10, and is defined by the first dual-contact assembly 18 being physically engaged with a negative PP3 terminal 30 of battery 10, and the second dual-contact assembly 20 being physically engaged with a positive PP3 terminal 32 of battery 10. The second valid state is indicated by the dashed-line representation of battery 10, and is defined by the first dual-contact assembly 18 being physically engaged with positive PP3 terminal 32 of battery 10, and the second dual-contact assembly 20 being physically engaged with negative PP3 terminal 30 of battery 10.

In either of the first and second valid states shown in FIG. 1, appropriate electrical connections are established between the PP3 battery and circuit 14. Accordingly, in either state, appropriate electrical power is provided to device 12, and the arrangement avoids the potential damage that can occur in prior art systems as a result of installing a battery in an invalid orientation.

In typical embodiments, the appropriate electrical connections are established as a result of the engagement occurring between the dual-contact assemblies and the PP3 battery terminals. In particular, each dual-contact assembly is configured so that, when physically engaged with a positive PP3 battery terminal, the positive contact of the dual-contact assembly electrically engages the positive PP3 terminal, while the negative contact of the dual-contact assembly is electrically insulated from the positive PP3 terminal. Conversely, but similarly, when the dual-contact assembly is engaged with a negative PP3 battery terminal, the positive contact of the dual-contact assembly is electrically insulated from the negative PP3 terminal, while the negative contact of the dual-contact assembly electrically engages the negative PP3 terminal.

Figure 2:
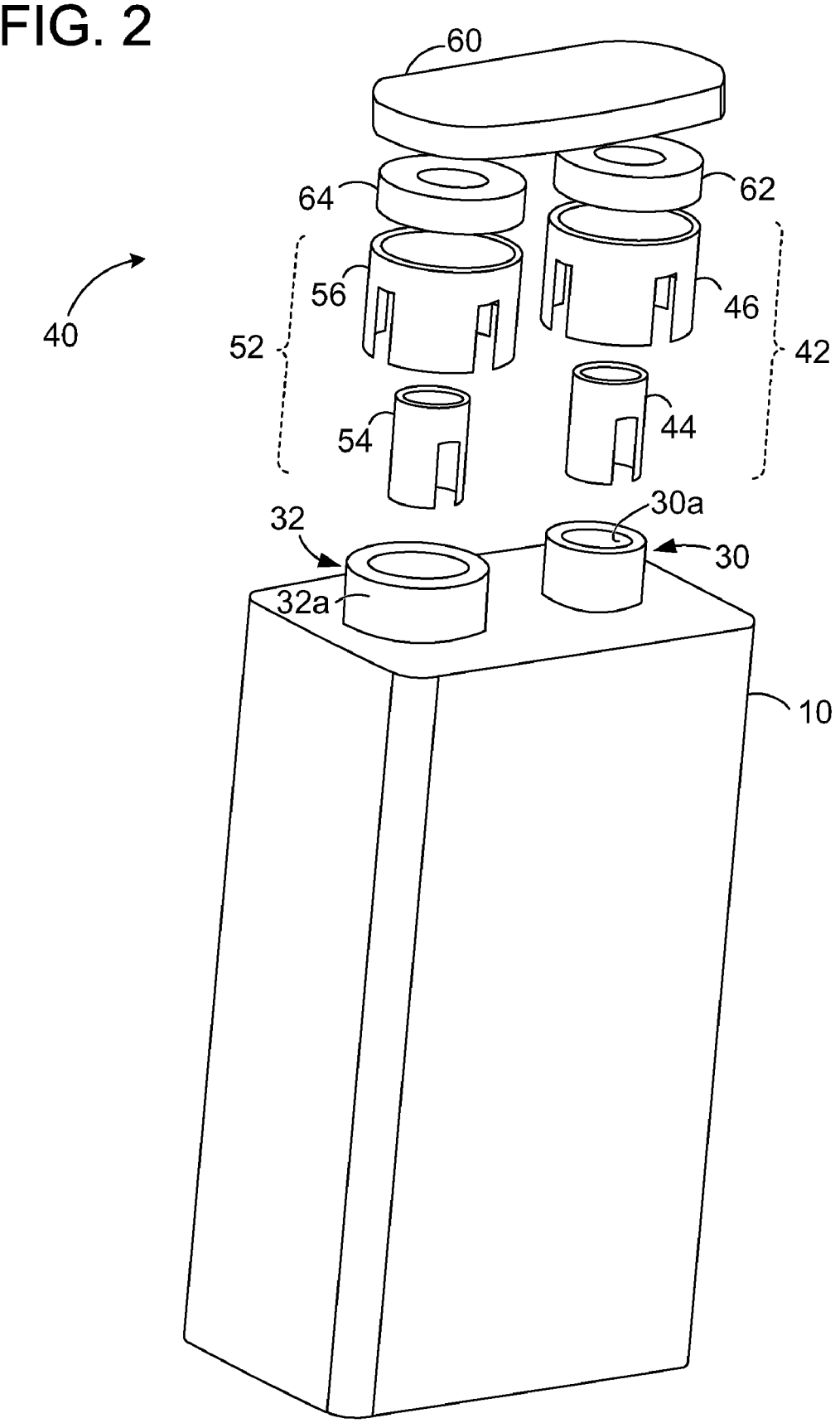
FIGS. 2 and 3 are exploded views of embodiments of a battery connector that may be used to electrically couple a battery to a battery-powered device.

FIG. 2 depicts PP3 battery 10 with a further embodiment of a connector 40 for electrically coupling battery 10 to a device. The components of connector 40 are shown in an exploded view for clarity. Connector 40 includes a first dual-contact assembly 42, including a positive contact 44 for contacting a positive PP3 battery terminal and a negative contact 46 for contacting a negative PP3 battery terminal. The connector also includes a second dual-contact assembly 52, including a positive contact 54 for contacting a positive PP3 battery terminal and a negative contact 56 for contacting a negative PP3 battery terminal. As previously discussed, two valid connection states are permitted, in which either PP3 terminal can be validly electrically connected to either dual-contact assembly. Only one of the states/orientations is shown in FIG. 2—i.e., an orientation in which terminal 32 is aligned and engaged with dual-contact assembly 52 and terminal 30 is aligned and engaged with dual-contact assembly 42.

Contacts 44, 46, 54 and 56 may be mounted to a base structure 60, which may also include a printed circuit board (PCB) or other connection mechanism. Specifically, positive contacts 44 and 54 typically are connected together, and/or to a positive circuit connection on the device to be powered (e.g., positive portion 22 of circuit 14 in FIG. 1). Similarly, negative contacts 46 and 56 typically are connected together and/or to a negative circuit connection of the device being powered (e.g., negative portion 24 of circuit 14 in FIG. 1). In addition, insulator structures 62 and 64 may be provided, to insulate each positive contact from each negative contact, and/or to hold the positive contact in a co-axial alignment or other desired orientation with respect to the negative contact. In addition to or instead of insulator structures, the contacts may simply be held in a spaced-apart orientation.

Contacts 44, 46, 54 and 56 may be generally cylindrical and/or otherwise adapted to physically engage with the generally cylindrical structure of the positive and negative PP3 battery terminals. For example, the negative contacts (i.e., contacts 46 and 56) may be configured to create an electrical connection by receiving and at least partially surrounding an outer diameter portion 32a of negative PP3 terminal 32. In addition, the negative contact may be sized or otherwise configured to provide a resiliently-biased engagement with the negative PP3 terminal. For example, a resilient metal may be employed for the negative contact. In addition, as in the depicted example, notches or cutaway portions may be employed to facilitate a resilient deformation of the negative contact, so as to provide a press-fit or other resilient engagement when the negative PP3 terminal is received within the negative contact.

Similarly, the positive contacts (i.e., contacts 44 and 54) may be configured so that an electrical connection is created when one of them is received within and at least partially surrounded by an inner diameter portion 30a of positive PP3 battery terminal 30. As with the negative contacts, the positive contacts may be configured to provide resiliently-biased engagement with the positive PP3 terminal, so as to ensure a reliable electrical connection. Resilient engagement may be facilitated via choice of conductive material, and by providing notches or cutaways, as depicted on positive contacts 44 and 54. As discussed with reference to FIG. 1, each of dual-contact assemblies 42 and 52 are structured such that, when the dual-contact assembly is physically engaged with positive PP3 battery terminal, the positive contact electrically engages the positive PP3 terminal while the negative contact is insulated from the positive PP3 terminal, and when the dual-contact assembly is physically engaged with the negative PP3 battery terminal, the positive contact is insulated from the negative PP3 terminal while the negative contact electrically engages the negative PP3 terminal. Accordingly, regardless of which orientation the battery is placed in, appropriate electrical connectivity is established between the battery and device.

Figure 3:
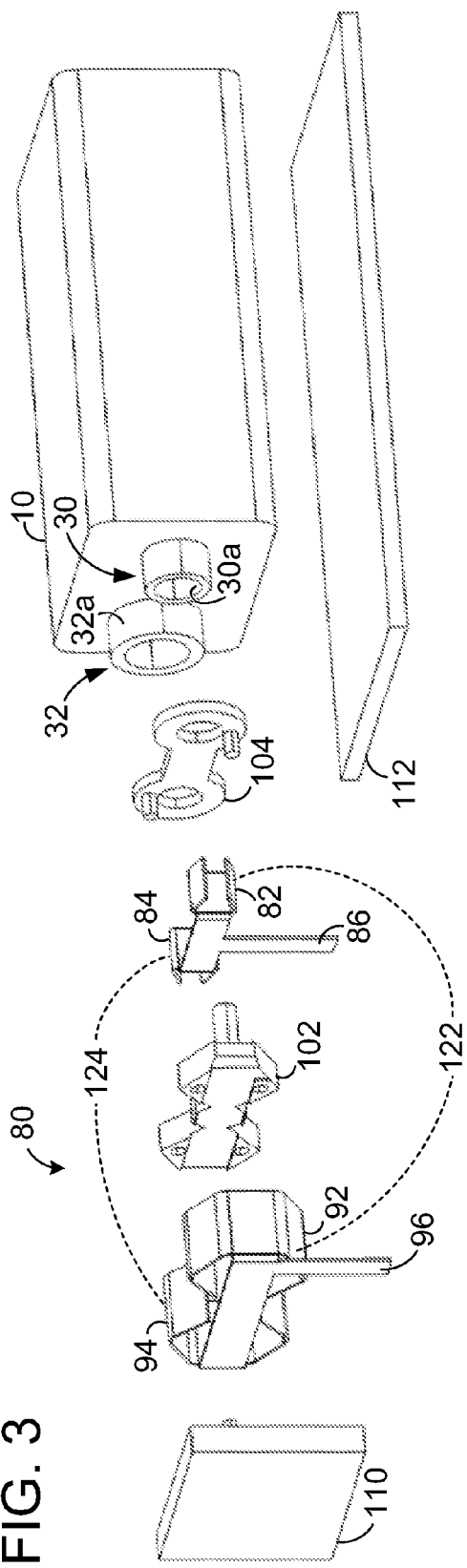

FIG. 3 depicts PP3 battery 10 with another embodiment of a connector 80 for electrically coupling the PP3 battery to a device. As with FIG. 2, the various components that may be employed with the connector are shown in an exploded view. FIG. 3 is similar in many respects to FIG. 2. One point of contrast is that positive contacts 82 and 84 are formed as part of a unitary conductive structure, along with positive circuit connection 86. Similarly, negative contacts 92 and 94 are formed unitarily, along with negative circuit connection 96. Insulator structures 102 and 104 may also be provided, to electrically insulate the two conductive structures from one another and hold them in a desired relative position to one another. In particular, the four structures between battery 10 and base structure 110 may be assembled together in a stacked configuration. Together with base structure 112, base structure 110 may be used to support the battery and connector structures, and/or to provide electrical and physical connections to components of a battery-operated device.

Using the dual-contact assembly language of the prior examples, positive contact 82 and negative contact 92 define a first dual-contact assembly 122 of connector 80, while a second dual-contact assembly 124 is defined by positive contact 84 and negative contact 94. Also as in the prior examples, a valid electrical engagement may be created by connecting either PP3 terminal (30 or 32) of battery 10 to either dual-contact assembly (122 or 124). If a given one of the dual-contact assemblies is engaged with the positive PP3 terminal, its positive contact is connected to the positive PP3 terminal and its negative contact is insulated from the positive PP3 terminal. On the other hand, if the dual-contact assembly is engaged with the negative PP3 terminal, its negative contact is electrically engaged with the negative PP3 terminal while its positive contact is insulated from the negative PP3 terminal. Also, similar to the embodiment of FIG. 2, the contacts may be generally cylindrical and/or otherwise configured to create resiliently-biased engagement with the generally cylindrical structures of the PP3 battery terminals. Regardless of which orientation the battery is placed in, appropriate conductivity may be provided to the device via positive circuit connection 86 and negative circuit connection 96. These connections may correspond to connections 26 and 28, respectively, of FIG. 1.

Figure 4:
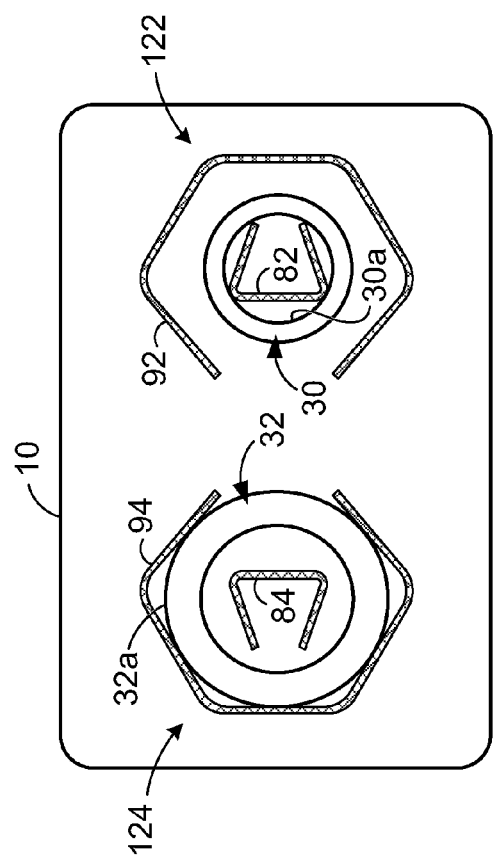
FIG. 4 is a top view of a battery, shown together with certain cross-sectioned components of a battery connector that may be used to electrically couple the battery to a battery-powered device.

FIG. 4 shows a top plan view of battery 10, with its PP3 terminals engaged with the dual-contact assemblies of the connector embodiment of FIG. 3. In particular, the positive and negative contacts of dual-contact assemblies 122 and 124 are shown in cross-section. Negative PP3 terminal 32 is shown as being received within and at least partially surrounded by negative contact 94. The negative contact 94 makes electrical contact with the outer diameter or wall portion 32*a* of the terminal, and the electrical engagement may be maintained via a resiliently-biased engagement, as previously described. As shown in the figure, the biasing may occur radially in an inward direction against the outer wall region of the terminal. Meanwhile, the relative positions of negative contact 94 and positive contact 84 result in the positive contact 84 being spaced and insulated from negative PP3 battery terminal 32. As previously discussed, the spacing and insulating may be provided by insulator structures 102 and 104 (not shown in FIG. 4).

Continuing with FIG. 4, positive contact 82 is shown as received within and at least partially surrounded by an inner diameter or wall portion 30*a* of positive PP3 terminal 30. The positive contact 82 makes electrical contact with the positive PP3 terminal, and the electrical connection may be established and maintained via a resiliently-biased engagement with the inner wall of the terminal, as previously explained. Similar to the negative contact, the connection of the positive contact may be maintained via biasing in a radial direction, or outward urging of the contact against the inner wall region of the positive battery terminal. The relative physical positions of positive contact 82 and negative contact 92 result in the negative contact 92 being spaced and insulated from positive PP3 battery terminal 30. Although not depicted in FIG. 4, it should be understood that the connector embodiment of FIG. 2 may be engaged with a battery in a manner similar to that shown in FIG. 4.

In addition to or instead of the above examples, the contact structures of the dual-contact assemblies may be formed from and/or interconnected by wire or wire-like structures. For example, a wire contact may be employed to contact the inner wall portion of a positive PP3 terminal. Such a contact can be adapted to provide a spring-maintained or resiliently-biased connection to ensure electrical contact with the battery terminal. Similarly, a contact formed from wire or wire-like structures may be employed to engage an outer portion of a negative PP3 terminal. When employed, wire-type contacts may or may not involve a cylindrical shape or configuration, and the contacts may or may not be shaped to partially surround or be surrounded by the respective battery terminal. Indeed, it should be appreciated that various wire contact configurations may be employed in connection with the presently-described battery connectors.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A connector for electrically coupling a PP3 battery with a battery-powered device, the connector comprising:
   a first dual-contact assembly including a positive contact configured to contact a positive PP3 terminal of the PP3 battery and a negative contact configured to contact a negative PP3 terminal of the PP3 battery; and
   a second dual-contact assembly including a positive contact configured to contact the positive PP3 terminal of the PP3 battery and a negative contact configured to contact the negative PP3 terminal of the PP3 battery,
   where each of the first dual-contact assembly and the second dual-contact assembly is configured such that when the dual-contact assembly is physically engaged with the positive PP3 terminal of the PP3 battery, the positive contact of the dual-contact assembly is sized and configured to cause resiliently-biased electrical engagement with an inner portion of the positive PP3 terminal while the negative contact is electrically insulated from the positive PP3 terminal,
   where each of the first dual-contact assembly and the second dual-contact assembly is configured such that when the dual-contact assembly is physically engaged with the negative PP3 terminal of the PP3 battery, the negative contact of the dual-contact assembly is sized and configured to cause resiliently-biased electrical engagement with an outer portion of the negative PP3 terminal while the positive contact is electrically insulated from the negative PP3 terminal.

2. The connector of claim 1, where for each of the first dual-contact assembly and the second dual-contact assembly, the positive contact of the dual-contact assembly is sized to be received within and surrounded by the inner portion of the positive PP3 terminal of the PP3 battery, and the negative contact of the dual-contact assembly is sized to receive and at least partially surround the outer portion of the negative PP3 terminal of the PP3 battery.

3. The connector of claim 2, where each of the first dual-contact assembly and the second dual-contact assembly is configured such that when the dual-contact assembly is physically engaged with the positive PP3 terminal of the PP3 battery, the positive contact of the dual-contact assembly is radially biased outward against the inner portion of the positive PP3 terminal of the PP3 battery so as to cause resiliently-biased engagement.

4. The connector of claim 2, where each of the first dual-contact assembly and the second dual-contact assembly is configured such that when the dual-contact assembly is physically engaged with the negative PP3 terminal of the PP3 battery, the negative contact of the dual-contact assembly is radially biased inward against the outer portion of the negative PP3 terminal of the PP3 battery so as to cause resiliently-biased engagement.

5. The connector of claim 3, where for each of the first dual-contact assembly and the second dual-contact assembly, each of the positive contact of the dual-contact assembly and the negative contact of the dual-contact assembly have a partially polygonal shape.

6. The connector of claim 5, where for each of the first dual-contact assembly and the second dual-contact assembly, the negative contact of the dual-contact assembly has a partially hexagonal shape.

7. The connector of claim 5, where for each of the first dual-contact assembly and the second dual-contact assembly, each of the positive contact of the dual-contact assembly and the negative contact of the dual-contact assembly are generally cylindrical.

8. The connector of claim 7, where for each of the first dual-contact assembly and the second dual-contact assembly, resiliently-biased engagement is facilitated by one or more notches in one or more of the positive contact of the dual-contact assembly and the negative contact of the dual-contact assembly.

9. The connector of claim 1, where for each of the first dual-contact assembly and the second dual-contact assembly, a diameter of the positive contact of the dual-contact assembly is smaller than a diameter of the negative contact of the dual-contact assembly to facilitate assembly in a stacked configuration.

10. A connector for electrically coupling a battery with a battery-powered device, the connector comprising:
   a first dual-contact assembly including a positive contact configured to contact a positive terminal of the battery and a negative contact configured to contact a negative terminal of the battery; and
   a second dual-contact assembly including a positive contact configured to contact the positive terminal of the battery and a negative contact configured to contact the negative terminal of the battery,
   where each dual-contact assembly is configured so that, when the dual-contact assembly is physically engaged with either of the battery terminals, one of the contacts of the dual-contact assembly is radially biased against a wall portion of the engaged battery terminal to electrically engage the engaged battery terminal, while the other of the contacts of the dual-contact assembly is spaced and electrically insulated from the engaged battery terminal,
   where each dual-contact assembly is configured so that, when the dual-contact assembly is physically engaged with the negative terminal of the battery, the negative terminal of the battery is received within and at least partially surrounded by the negative contact of the dual-contact assembly, and the positive contact of the dual-contact assembly is configured so that, when the dual-contact assembly is physically engaged with the positive terminal of the battery, the positive contact of the dual-contact assembly is received within and at least partially surrounded by the positive terminal of the battery.

11. The connector of claim 10, where the one of the contacts of the dual-contact assembly is radially biased against a wall portion of a generally cylindrical structure of the engaged battery terminal.

12. The connector of claim 10, where the battery is a PP3 battery.

13. The connector of claim 10, where each of the first dual-contact assembly and the second dual-contact assembly is configured such that when the dual-contact assembly is physically engaged with the positive terminal of the battery, the positive contact of the dual-contact assembly is radially biased outward against an inner portion of the positive terminal of the battery.

14. The connector of claim 10, where each of the first dual-contact assembly and the second dual-contact assembly is configured such that when the dual-contact assembly is physically engaged with the negative terminal of the battery, the negative contact of the dual-contact assembly is radially biased inward against an outer portion of the negative terminal of the battery.

15. The connector of claim 10, where for each of the first dual-contact assembly and the second dual-contact assembly, a diameter of the positive contact of the dual-contact assembly is smaller than a diameter of the negative contact of the dual-contact assembly to facilitate assembly in a stacked configuration.

16. The connector of claim 10, where for each of the first dual-contact assembly and the second dual-contact assembly, each of the positive contact of the dual-contact assembly and the negative contact of the dual-contact assembly have a partially polygonal shape.

17. The connector of claim 10, where for each of the first dual-contact assembly and the second dual-contact assembly, each of the positive contact of the dual-contact assembly and the negative contact of the dual-contact assembly are generally cylindrical.

18. A device configured to be electrically powered by a PP3 battery, the device comprising:
   a circuit via which the device receives and distributes electrical power from the PP3 battery to one or more other components of the device; and
   a connector for electrically coupling the PP3 battery to the circuit, the connector including a first dual-contact assembly and a second dual-contact assembly, the connector being engageable with the PP3 battery in either of a first valid state and a second valid state, the first valid state being defined by the first dual-contact assembly being physically engaged with a positive PP3 terminal of the PP3 battery and the second dual-contact assembly being physically engaged with a negative PP3 terminal of the PP3 battery, the second valid state being defined by the first dual-contact assembly being physically engaged with the negative PP3 terminal of the PP3 battery and the second dual-contact assembly being physically engaged with the positive PP3 terminal of the PP3 battery,
   where for each of the first dual-contact assembly and the second dual-contact assembly, the dual-contact assembly includes a generally cylindrical positive contact electrically coupled with a positive portion of the circuit and a generally cylindrical negative contact electrically coupled with a negative portion of the circuit, the positive contact and the negative contact being configured such that, when the dual-contact assembly is physically engaged with the positive PP3 terminal of the PP3 battery, the positive contact is received within and partially surrounded by an inner diameter portion of the positive PP3 terminal and is electrically coupled via resilient engagement with the inner diameter portion of the positive PP3 terminal while the negative contact is electrically insulated from the positive PP3 terminal, the positive contact and the negative contact of the dual-contact assembly being further configured such that, when the dual-contact assembly is physically engaged with the negative PP3 terminal of the PP3 battery, the negative contact receives and partially surrounds an outer diameter portion of the negative PP3 terminal and is electrically coupled via resilient engagement with the outer diameter portion the negative PP3 terminal while the positive contact is electrically insulated from the negative PP3 terminal.

19. The device of claim 18, where for each of the first dual-contact assembly and the second dual-contact assembly, when the dual-contact assembly is physically engaged with the positive PP3 terminal of the PP3 battery, the positive contact of the dual-contact assembly is radially biased outward against the inner diameter portion of the positive PP3 terminal of the PP3 battery so as to cause resilient engagement.

20. The device of claim 18, where for each of the first dual-contact assembly and the second dual-contact assembly, when the dual-contact assembly is physically engaged with the negative PP3 terminal of the PP3 battery, the negative contact of the dual-contact assembly is radially biased inward against the outer diameter portion of the negative PP3 terminal of the PP3 battery so as to cause resilient engagement.

* * * * *